Feb. 27, 1934.    R. R. HALSTEAD    1,948,791
AIR FILTER
Filed Nov. 19, 1931    2 Sheets-Sheet 1
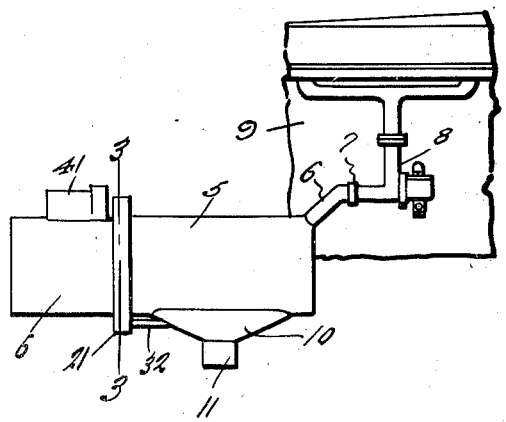
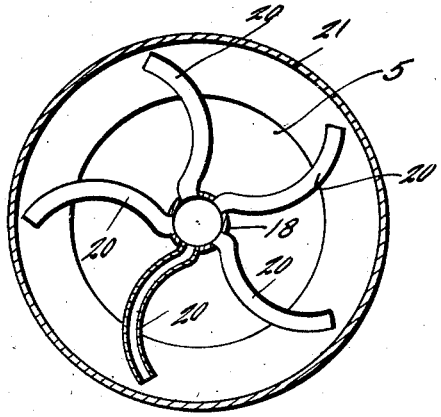
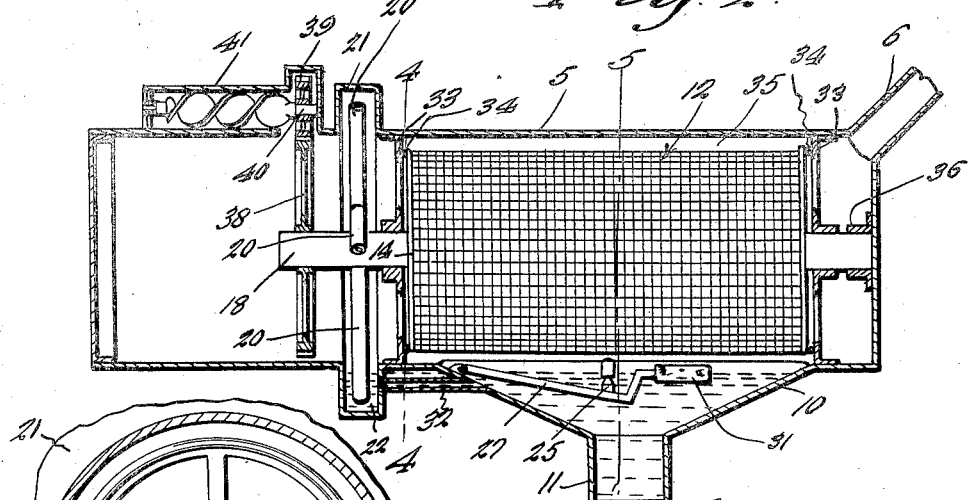
Inventor
R. R. Halstead
By Clarence A. O'Brien
Attorney Feb. 27, 1934.   R. R. HALSTEAD   1,948,791
AIR FILTER
Filed Nov. 19, 1931   2 Sheets-Sheet 2
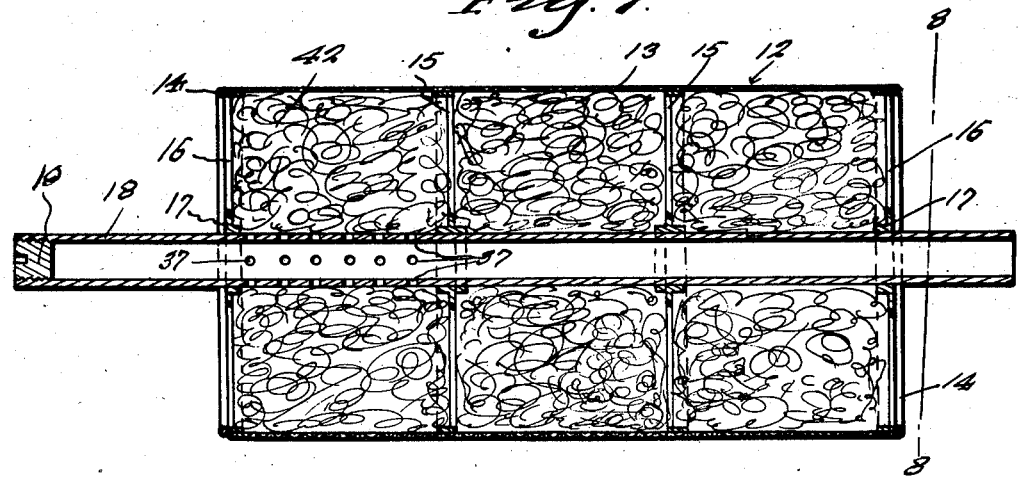
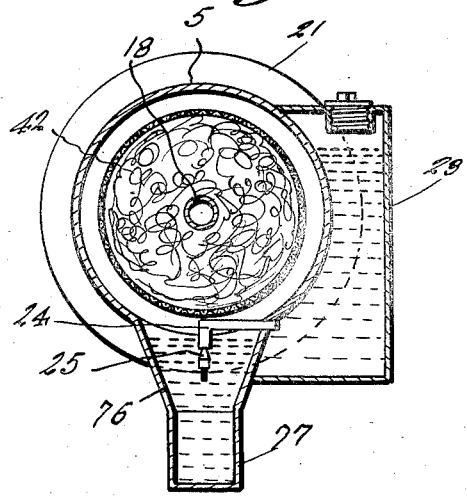
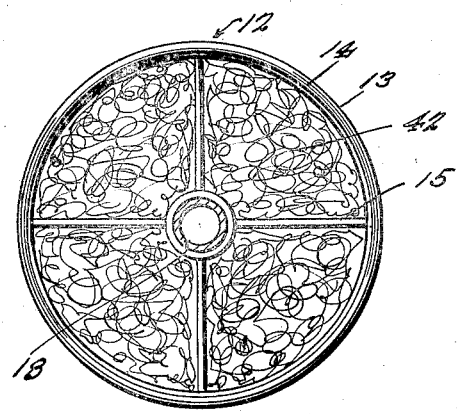
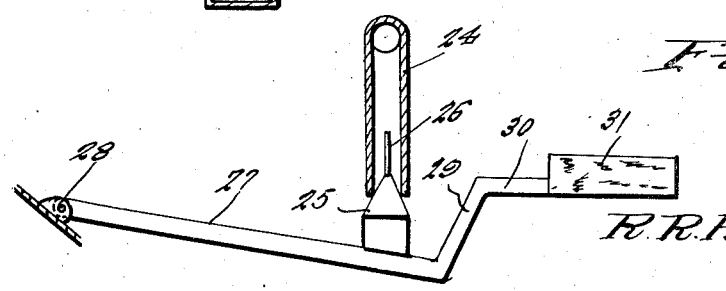
Inventor
R. R. Halstead.
By Clarence A. O'Brien
Attorney Patented Feb. 27, 1934

1,948,791

UNITED STATES PATENT OFFICE 1,948,791

AIR FILTER

Richard R. Halstead, Beach, N. Dak.

Application November 19, 1931
Serial No. 576,164

1 Claim. (Cl. 183—63)

REISSUED

This invention appertains to new and useful improvements in the general art of gas separation, and more particularly to a novel air cleaner for use in conjunction with engines of the internal combustion type.

The principal object of this invention is to provide a filter through which air is drawn by the suction of an internal combustion engine, to which it is attached in a manner whereby all dust and other foreign matter is removed in an efficient manner.

Another important object of the invention is to provide an air cleaner involving a mobile cleaning unit which in operation not only cleans, by filtration, the air fed to the engine, but also eliminates the foreign matter collected therein.

Other important objects and advantages of the invention will become apparent to the reader of the following specification.

In the drawings:—

Figure 1 represents a fragmentary side elevational view of an engine showing the air cleaner attached thereto.

Fig. 2 represents a longitudinal sectional view through the air cleaner.

Fig. 3 represents a sectional view taken substantially on line 3—3 of Fig. 1.

Fig. 4 represents a cross sectional view taken substantially on line 4—4 of Fig. 2.

Fig. 5 represents a sectional view taken substantially on line 5—5 of Fig. 2.

Fig. 6 represents a fragmentary detailed sectional view showing the float-controlled valve.

Fig. 7 represents a longitudinal sectional view through the rotor and shaft.

Fig. 8 represents a sectional view taken substantially on line 8—8 of Fig. 7.

Referring to the drawings wherein like numerals designate like parts, it can be seen that the preferred form of the invention includes a cylindrical shell 5 having a neck 6 at one end for attachment as at 7 to the usual intake manifold pipe 8, which is associated with the engine 9 as shown in Fig. 1. The bottom portion of this shell 5 depends to form a basin 10 which merges at its lowermost point with the well 11 forming a settling receiver for sediment in the oil expelled by the rotor generally referred to by numeral 12.

As is clearly shown in Fig. 7, this rotor consists of a cylinder 13 of mesh material having an annular rib or bead 14 secured to each end thereof. Wire spiders 15 sustain the shape of the cylinder 13 in the intermediate portion, while spiders 16 are provided at the ends of the rotor cylinder 13, each having a hub 17 for receiving the elongated hollow shaft 18 which extends thru the rotor and beyond each end thereof. The rear end of this shaft 18 is plugged as at 19, while extending curvedly from the shaft 18 adjacent the plugged end portion are the collectors 20, each being of tubular construction and open at its outer end, as in the manner substantially shown in Fig. 3.

The interior of each of these collectors 20 communicates with the interior of the shaft 18 and obviously as these collectors rotate in the rideway 21 of the shell 5, they collect oil 22 from the bottom thereof.

By referring to Fig. 5, it can be seen that a reservoir 23 is provided on one side of the shell 5 and a conduit 24 extends therefrom and into the interior of the basin 10. As is clearly shown in Fig. 6, numeral 25 represents a conical valve having a guide stem 26 which is operable within the open end of the conduit 24 whereby the supply of the reservoir 23 can be controlled. This valve 25 is located on the elongated arm 27 which is pivotally connected to the wall of the basin 10 as at 28. The outer end portion of the arm 27 is offset upwardly as at 29 and horizontally as at 30 to carry the float 31. This float and arm operate in the basin 10 to maintain a constant level of oil in this basin and to also control the level of oil in the rideway 21, oil being supplied from the basin 10 to the rideway 22 through the conduit 32.

Secured to the inside of the shell 5 at each end of the rotor 12 is a spider 33, each of which is provided on one side with an annular rib or bead 34 (see Fig. 4) for riding engagement against the corresponding rib or bead 14 on the rotor 12. Thus it can be seen that an air space 35 is provided between the rotor 12 and the shell 5 into which foreign matter can be thrown from the rotor 12.

The forward end of the aforementioned shaft is opened, and engages into the bearing 36 and incidentally lubricates this bearing, due to the fact that some of the oil collected by the collectors 20 will pass the outlet openings 37 in the shaft 18 adjacent the rear end of the rotor 12 and will travel to this end of the shaft for lubricating this bearing.

The mesh cylinder 12 is to be filled preferably with copper wool as a filtering substance for the air. For effecting rotation of the rotor 12, the rear end of the shaft 18 is provided with a gear wheel 38 which meshes with the pinion 39 carried by the screw shaft 40 operating in the housing 41 located upon the shell 5.

It can now be seen, that the suction of the engine to which this air cleaner is attached will be exerted longitudinally on the screw shaft 40 which will result in the rotation of the screw and the consequent rotation of the shaft 18. The rotor 12 being secured to the shaft 18, rotates therewith and in the rotation of the shaft 18, the oil collectors 20 dip up oil which runs into the shaft 18 and out through the openings 37 into the copper wool 42.

Thus, the rear end of the copper wool mass becomes saturated with oil which obviously assists materially in cleaning air as it passes through this portion of the copper wool. As the air passes through the remaining portion of the copper wool, it is cleaned of whatever oil residue remains therein, before the air reaches the forward spider 33, at which point it leaves the rotor 12 to enter the intake manifold pipe 8 by way of the neck 6.

The rotation of the rotor 12 serves continuously to expel the used oil in the rear end of the rotor 12 and incidentally to eliminate whatever foreign matter has been collected by the oil. The oil returns to the basin 10 and any sediment therein, settles to the well 11 while this oil is used over again, and automatically, the level in the basin 10 is maintained by the aforementioned float controlled valve 25.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

An air filter of the character described comprising a shell, an air inlet at one end of the shell, an air outlet at the opposite end of the shell, said shell being provided with a filtering rotor therein, an internal fluid fountain in the rotor, a sump basin below the rotor, a sump fluid reservoir, a conduit between the reservoir and the basin, and a float valve controlled by the level of fluid in the sump basin and being interposed in the conduit whereby the level of the fluid in the sump basin will be maintained below the rotor.

RICHARD R. HALSTEAD.